United States Patent
Gollapudi et al.

(10) Patent No.: US 7,580,971 B1
(45) Date of Patent: Aug. 25, 2009

(54) METHOD AND APPARATUS FOR EFFICIENT SQL PROCESSING IN AN N-TIER ARCHITECTURE

(75) Inventors: Sreenivas Gollapudi, Fremont, CA (US); Debashis Saha, Menlo Park, CA (US); Anindo Roy, Fremont, CA (US); Lakshminarayanan Chidambaran, Fremont, CA (US); Debashish Chatterjee, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 484 days.

(21) Appl. No.: 09/953,490

(22) Filed: Sep. 10, 2001

Related U.S. Application Data

(60) Provisional application No. 60/261,472, filed on Jan. 11, 2001.

(51) Int. Cl.
*G06F 15/16* (2006.01)
(52) U.S. Cl. .......................... 709/203; 709/239; 709/10
(58) Field of Classification Search ................. 709/203, 709/226, 237, 239, 212, 214, 216, 238, 242, 709/200, 23; 707/1, 3, 10, 202, 214, 205
See application file for complete search history.

(56) References Cited

U.S. PATENT DOCUMENTS

| | | | |
|---|---|---|---|
| 5,586,260 A | 12/1996 | Hu | |
| 5,604,490 A | 2/1997 | Blakley, III et al. | |
| 5,764,890 A | 6/1998 | Glasser et al. | |
| 5,832,521 A * | 11/1998 | Klots et al. | 707/203 |
| 5,875,296 A | 2/1999 | Shi et al. | |
| 5,913,025 A | 6/1999 | Higley et al. | |
| 6,012,090 A * | 1/2000 | Chung et al. | 709/219 |
| 6,023,684 A | 2/2000 | Pearson | |
| 6,052,785 A | 4/2000 | Lin et al. | |
| 6,067,623 A | 5/2000 | Blakley, III et al. | |
| 6,076,092 A | 6/2000 | Goldberg et al. | |
| 6,115,040 A | 9/2000 | Bladow et al. | |
| 6,134,594 A | 10/2000 | Helland et al. | |
| 6,141,333 A * | 10/2000 | Chavez, Jr. | 370/338 |
| 6,141,759 A | 10/2000 | Braddy | |
| 6,178,418 B1 * | 1/2001 | Singer | 707/3 |
| 6,178,425 B1 * | 1/2001 | Brodersen et al. | 707/101 |
| 6,185,608 B1 * | 2/2001 | Hon et al. | 709/216 |
| 6,226,684 B1 * | 5/2001 | Sung et al. | 709/238 |
| 6,286,104 B1 | 9/2001 | Buhle et al. | |

(Continued)

*Primary Examiner*—Ario Etienne
*Assistant Examiner*—El Hadji M Sall
(74) *Attorney, Agent, or Firm*—Vista IP Law Group, LLP.

(57) ABSTRACT

A method and apparatus for efficiently processing data requests in a network oriented n-tier database environment is presented. According to one embodiment of the invention, certain or all data from the tables of a database server device can be maintained in tables on the client device in a client side database cache server system. This local cache allows the network oriented n-tier database system to eliminate the expense of repetitive network transmissions to respond to duplicate queries for the same information. Additionally, the local client device may also keep track of what data is cached on peer network nodes. This allows the client to request that data from a peer database cache server and off load that burden from the database server device. Moreover, the local client may also keep statistics regarding the frequency of requested data in order to optimize the data set maintained in the local database cache server.

34 Claims, 8 Drawing Sheets

U.S. PATENT DOCUMENTS

| | | | |
|---|---|---|---|
| 6,564,218 B1 * | 5/2003 | Roth | 707/10 |
| 6,651,072 B1 * | 11/2003 | Carino et al. | 707/10 |
| 6,662,230 B1 * | 12/2003 | Eichstaedt et al. | 709/229 |
| 6,678,773 B2 * | 1/2004 | Marietta et al. | 710/200 |
| 6,680,942 B2 * | 1/2004 | Mead et al. | 370/392 |
| 6,748,381 B1 * | 6/2004 | Chao et al. | 707/10 |
| 6,785,707 B2 * | 8/2004 | Teeple | 709/203 |
| 6,801,933 B1 * | 10/2004 | Leppinen | 709/213 |
| 6,857,012 B2 * | 2/2005 | Sim et al. | 709/222 |
| 2002/0023139 A1 * | 2/2002 | Hultgren | 709/216 |

* cited by examiner

METHOD AND APPARATUS FOR EFFICIENT SQL PROCESSING IN AN N-TIER ARCHITECTURE

RELATED APPLICATION

The present application claims priority to U.S. provisional patent application Ser. No. 60/261,472, filed on Jan. 11, 2001, entitled METHOD AND APPARATUS FOR EFFICIENT SQL PROCESSING IN AN N-TIER ARTHITECTURE, which is hereby incorporated by reference in its entirety.

BACKGROUND OF THE INVENTION

1. Field of the Invention

The invention relates to computer database data request systems, and more particularly to the efficient processing of database requests in an n-tier computer network environment.

2. Related Art

Many companies that utilize computer database systems face the issues of network bandwidth, transaction speed, and client and server performance. These issues are fundamentally related to the current architecture for computer networked database systems.

For example, in the existing architecture, all queries from a client are sent to a database server for execution. The client and the server typically reside on different computers on the network. Thus, each client data request requires a round trip over the network. In the request portion of the round trip, the data request is delivered from the client to the server. On this portion of the round trip, a data request may pass through several tiers or intermediate servers, for example an application server. In the response portion of the round trip, a response is delivered from the server to the client. The performance of a network round trip depends on the stability, bandwidth, and traffic density of the network as well as the load on the server. Several queries sent at once, or a single large data request can potentially slow down the performance.

This type of increased response time is currently experienced notwithstanding the availability of unused computing power on the client computer. Furthermore, as the number of clients on a network increase, the scalability of the server must similarly increase in order to handle an increased number of queries.

SUMMARY OF THE INVENTION

The present invention relates to a method and apparatus for efficiently processing data requests in a computer network oriented n-tier database environment. According to one embodiment of the invention, certain tables from the database server system can be maintained on the client system in a local cache storage system. A local database cache server manages the local cache storage system and allows the n-tier database environment to eliminate the expense of repetitive network transmissions to respond to similar queries for similar information.

Additionally, the local client may also keep track of what data is stored in the local cache storage system of peer client systems residing on the network. This allows the client to route data requests to a peer client system's database cache server, rather than the database server system. Moreover, the local client may also keep a record of frequently requested tables in order to optimize the data set maintained in the client's local cache storage system.

Further details, aspects, objects, and advantages of the invention are described below in the drawings, detailed description, and claims.

BRIEF DESCRIPTION OF THE DRAWINGS

The accompanying drawings are included to provide a further understanding of the invention and, together with the Detailed Description, serve to explain the principles of the invention, in which.

DETAILED DESCRIPTION OF THE INVENTION

The present invention is directed toward a method and apparatus for efficient query processing. More specifically, the present invention relates to the implementation of local database cache servers to decrease network traffic and server load in an n-tier database environment implemented over a computer network. After reading this description, it will become apparent to one skilled in the art how to practice the invention in one or more alternative embodiments. As such, this detailed description of one or more alternative embodiments should not be construed to limit the scope of breadth of the present invention.

1. Introduction and Overview

Figure 1:
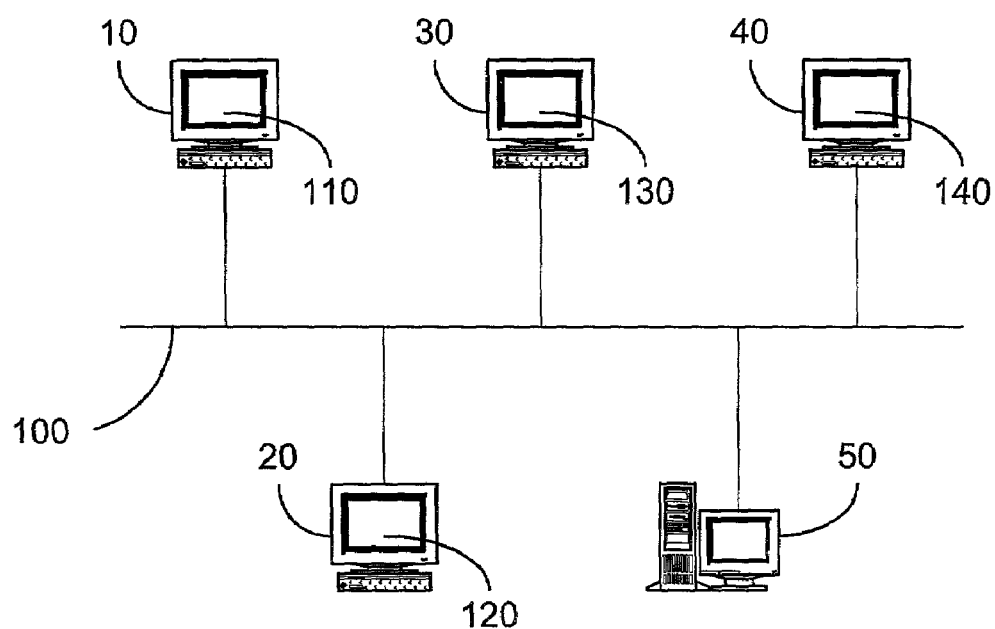
FIG. 1 is a block diagram illustrating an n-tier database environment implemented over a computer network according to one embodiment of the present invention.

An aspect of the present invention relates to an n-tier database environment implemented over a computer network. FIG. 1 is a block diagram illustrating an example n-tier database environment implemented over a computer network according to one embodiment of the present invention. In FIG. 1, there are four client computers, namely client 10, client 20, client 30, and client 40. Each client computer is coupled together with the other client computers and the database server 50 over the network 100.

Client 10 is configured with a database cache server 110. Similarly, client 20 is configured with database cache server 120, client 30 is configured with database cache server 130, and client 40 is configured with database cache server 140. To avoid confusion, the client computers 10-40 will hereafter be referred to singularly as client 10 and the database cache servers 110-140 will hereafter be referred to singularly as database cache server 110, except where appropriate to call attention to specific aspects of the present invention. Advantageously, client 10 is configured to communicate with database server 50 over the network 100. Additionally, database cache server 110 is configured to communicate with the database server 50 over the network 100.

Figure 2:
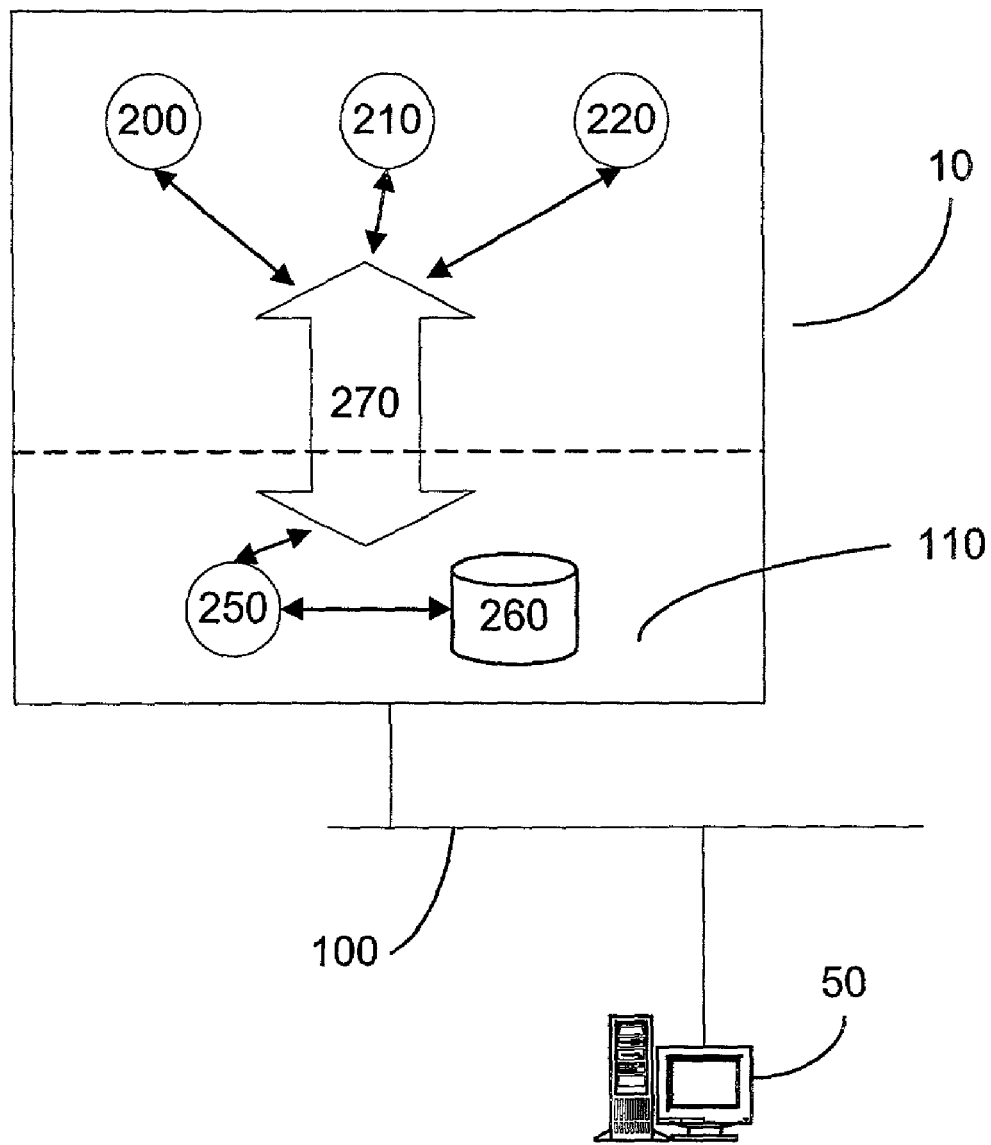
FIG. 2 is a block diagram depicting a client computer in a networked n-tier database environment according to one embodiment of the present invention.

FIG. 2 depicts a block diagram of client 10 coupled with server 50 over the network 100. In one embodiment, client 10 may be comprised of a database cache server 110 and a data request generator 200. In an alternative embodiment, the client 10 additionally comprises data request generator 210 and data request generator 220. In this alternative embodiment, client 10 may have more than one data request generator. A data request generator 200 may be any well known computer application capable of generating a standard database data request.

The database cache server 110 is comprised of a request router 250 and a partial database 260. The partial database 260 may be comprised of database tables containing a portion of the information stored in the database server 50. Additionally, partial database 260 may contain information regarding the peer database cache servers that may exist on client systems that may be accessible via the network 100. Furthermore, partial database 260 may contain information regarding the frequency of data requests from the data request generator 200. It may also contain statistics regarding the particular types of data requests that were successfully and unsuccessfully answered by the peer database cache servers. In one embodiment, the statistics may be used by the request router 250 to determine which peer database cache server to receive requests that may be unanswerable by the local database cache server 110.

The request router 250 may be configured to read data from and write data to the partial database 260. Additionally, the request router 250 may advantageously be configured to communicate with both the data request generator 200 and the database server 50. In one embodiment, the request router is configured to communicate with the data request generator 200 through a communications channel 270.

For example, a data request may originate from a data request generator 200. This data request may be sent by the data request generator 200 to the request router 250 via a communications channel 270. In one embodiment, communications channel 270 is a programmably created inter process communication pipe. Alternatively, communications channel 270 may be a commonly accessed area of shared memory or a shared file. Additionally, communications channel 270 may be a network socket. For example, in one embodiment, the database cache server 110 may reside on a separate computer on the network 100. The communications link 270 in this embodiment may be a socket that is open on both the client 10, where the data request generator 200 resides, and the computer where the database cache server 110 resides.

Once the data request is sent to the request router 250 via communications channel 270, the request router 250 consults the partial database 260. The request router 250 may then execute the data request to determine whether or not the partial database 260 contains the appropriate tables so that the request router 250 may provide a response to the data request. If the request router 250 may successfully respond to the data request, it may then retrieve the data from the corresponding tables in the partial database 260. Upon receiving the data from the partial database 260, the request router 250 may then forward that data in a response format to the data request generator 200. In one embodiment, the response is sent to the data request generator 200 through the communications channel 270.

Alternatively, the request router 250 may consult the partial database 260 and determine that the tables necessary to respond to the data request are not located within the partial database 260. Therefore, the request router 250 may not provide a response to the data request. In one embodiment, the request router 250 may then forward the data request over the network 100 to the database server 50. The request router 250 may determine the location of the database server 50 from the data request. The database server 50 may then respond to the data request in a standard fashion and send the response back to the request router 250 over the network 100. Once the request router 250 receives a response from the database server 50, the request router 250 may then forward that response to the data request generator 200.

Figure 3:
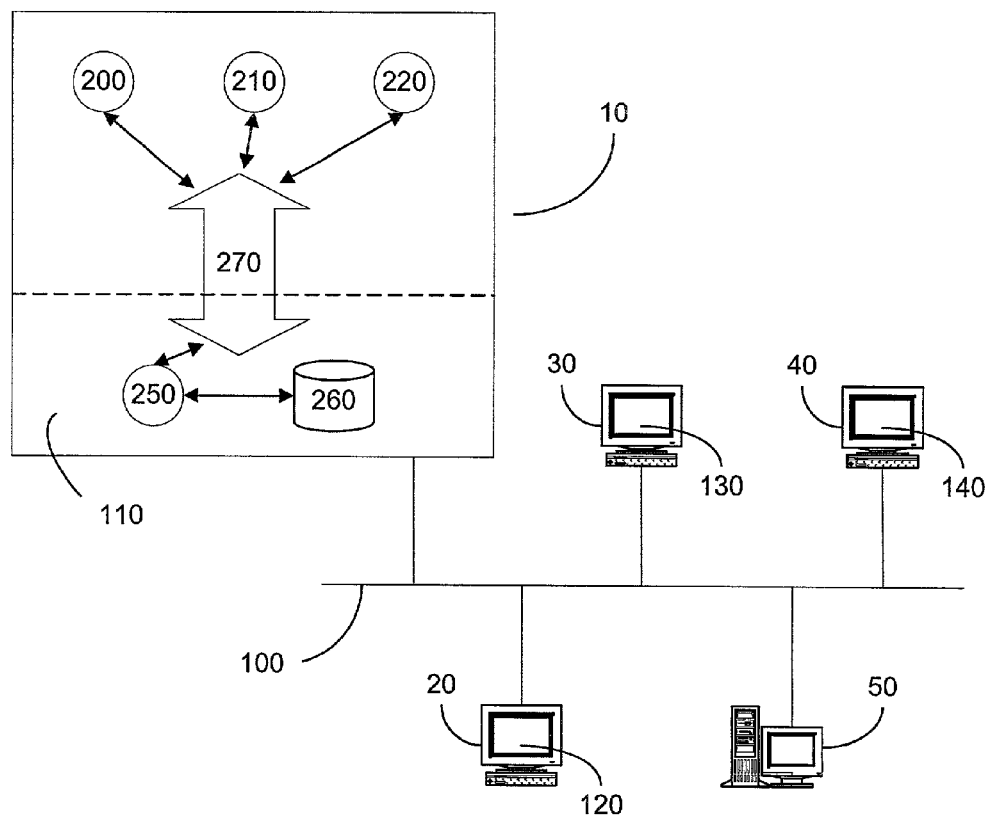
FIG. 3 is a block diagram illustrating a client computer integrated into the n-tier database environment according to one embodiment of the present invention.

FIG. 3 depicts the client 10 with database cache server 110 coupled over the network 100 with client 20, client 30, client 40, and the database server 50. Also shown in FIG. 3 is database cache server 120 coupled with client 20, database cache server 130 coupled with client 30, and database cache server 140 coupled with client 40. These additional database cache servers are collectively referred to as peer database cache servers. In one embodiment, one or more additional clients with peer database cache servers may be coupled with the client 10 and the database server 50 over the network 100.

In one embodiment, a state may arise where the request router 250 is unable to respond to a data request after consulting the tables in partial database 260. In this embodiment, the request router 250 may then forward the data request to the database server 50. Alternatively, the request router 250 may forward the data request to a peer database cache server.

For example, once the request router 250 receives a data request from the data request generator 200 via communications channel 270, the request router 250 executes the data request on the partial database 260. In one embodiment, execution of a data request on the partial database 260 determines whether the partial database 260 contains the tables necessary to correctly respond to the data request. If the request router 250 executes the data request on the partial database 260 and determines that it cannot respond to the data request, the request router 250 may forward the data request to the database server 50 for processing. Alternatively, the request router 250 may send the data request to a peer database cache server for processing.

For example, the request router 250 may send the data request to client 20 for processing by peer database cache server 120. Advantageously, sending a data request to a peer database cache server may reduce the load on the database server 50. Additionally, the response time for a data request sent to a peer database cache server may advantageously be less than the response time for a data request sent to the database server 50. This may be due to the relative workloads of the peer database cache server and the database server 50.

In one embodiment, request router 250 maintains information in partial database 260 regarding each peer database cache servers that is coupled with client 10 over the network 100. For example, partial database 260 may contain information regarding the success or failure of each peer database cache server for a particular type of data request. The request router 250 may consult this information in partial database 260 prior to selecting a client to receive the forwarded data request for processing by its associated peer database cache server. For example, request router 250 may determine from partial database 260 that client 20 was unable to successfully respond to a particular type of data request in the past. Therefore, request router 250 may not forward a data request of that particular type to client 20 for processing by database cache server 120.

In an alternative embodiment, request router 250 may determine from partial database 260 that client 30 has successfully responded to a particular type of data request in the past. Advantageously, the request router 250 may then intelligently determine that client 30 is the client with the highest likelihood of successfully responding to the data request. In this embodiment, request router 250 may then forward the data request to client 30 for processing by database cache server 130.

In one embodiment, request router 250 receives no information from partial database 260 regarding the relative success of peer database cache servers for responding to a particular type of data request. In this embodiment, request router 250 may then select a client from a lit of available clients and forward the data request to that client for processing by the client's associated peer database cache server. If the selected client is unsuccessful in responding to the data request, the request router 250 may select another client from the list and repeat the process.

For example, the request router 250 may first select client 20 and forward the data request to client 20 for processing by peer database cache server 120. If client 20 is unable to respond to the data request, the request router 250 may then select client 30 and forward the data request to client 30 for processing by peer database cache server 130. If the clients who receive the data request continue to be unsuccessful in responding to the data request, the request router 250 may proceed through the list of clients until a successful response is received or until the list is exhausted. In one embodiment, once the list is exhausted, the request router 250 forwards the data request to the database server 50 for processing.

Once request router 250 has received a successful response from a client with a peer database cache server, or the database server 50, request router 250 forwards the response to the requesting data request generator 200. In one embodiment, the request router 250 may additionally update partial database 260 with information regarding the success of each client in responding to the particular type of data request. Also in this embodiment, the request router may update partial database 260 with information regarding the failure of each client in responding to the particular type of data request. In this fashion, the next time request router 250 receives the particular type of request, the request can advantageously be initially forwarded to a client with a successful record for processing data requests of that particular type.

In one embodiment, each of the available peer database cache servers fails to successfully respond to the data request. In this embodiment, the request router 250 then sends the request to database server 50. When the request router 250 receives a successful response from the database server 50, the request router 250 forwards the response to the requesting data request generator 200. In one embodiment, the request router 250 may additionally update the tables in partial database 260 with the data from the database server 50. In this fashion, the database cache server 110 may advantageously respond to subsequent queries of that particular type without forwarding the data request to a peer database cache server or the database server 50.

Figure 4:
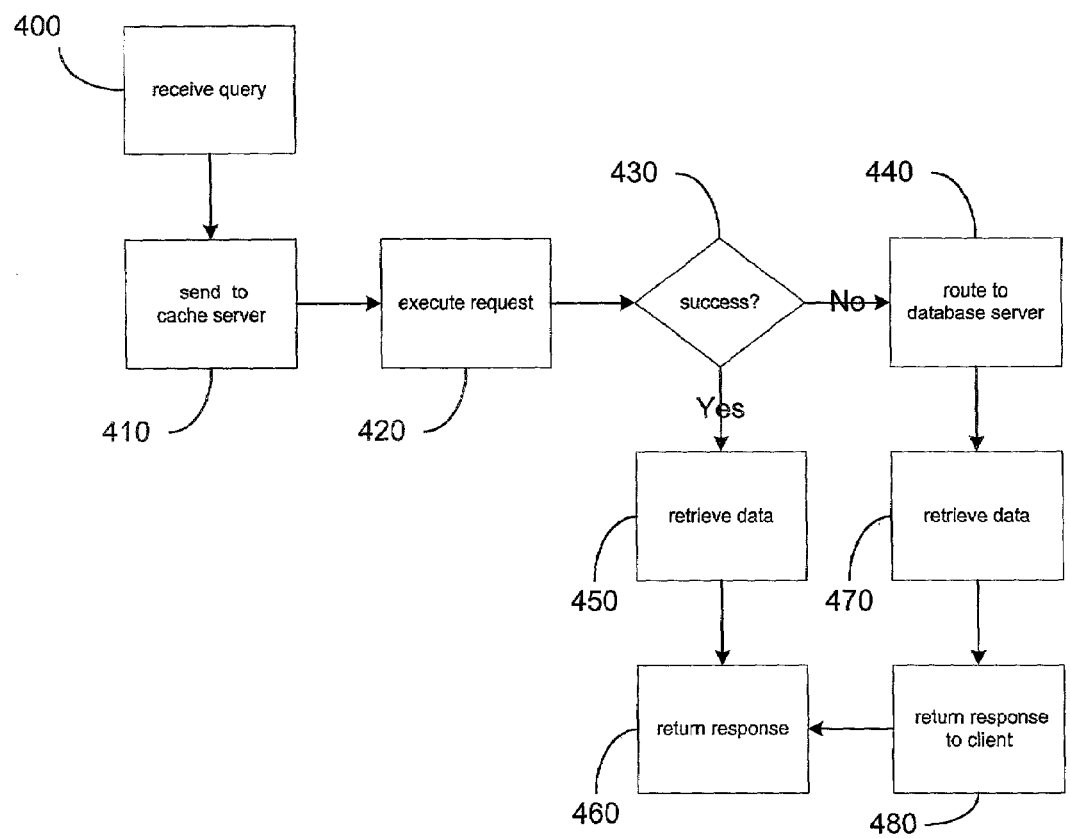
FIG. 4 depicts a high level process flowchart of one embodiment of the present invention.

FIG. 4 illustrates a high level flowchart detailing a process for a database cache server 110 to efficiently respond to data requests according to one embodiment of the present invention. In step 400, a data request is created by a data request generator 200. The data request generator 200 can be any type of standard or customized software application with the capability to generate a database data request. For example, a World Wide Web ("Web") browser may be a data request generator 200 because it has the capability to generate search requests for Web search engines.

Once a data request is created by the data request generator 200, the request is then sent to the database cache server 110 through communications channel 270. In one embodiment, the communications channel 270 is implemented by inter process communication. For example, the database cache server 110 may create a utility and make that utility available to the data request generator 200 so that the data request generator 200 may write data requests to the utility. Similarly, the database cache server 110 may read from the utility, thus creating a unidirectional pipe for communication from the data request generator 200 to the database cache server 110. Additionally, a corresponding unidirectional pipe for communication from the database cache server 110 to the data request generator 200 may be created by the database cache server 110. Furthermore, the communications channel 270 may be implemented in alternative embodiments through the use of shared files or shared memory. Moreover, one skilled in the art may employ alternative methods for the communications channel 270.

As shown in step 420, once the database cache server 110 has received the data request from the data request generator 200, the database cache server 110 may execute the data request. This execution of the data request serves the purpose of determining whether the database 260 contains the appropriate tables to satisfy the data request. In step 430, the database cache server 110 analyzes the results of step 420 to determine if the database cache server 110 may successfully respond to the data request. If the database cache server 110 determines that it cannot successfully respond to the data request, the database cache server 110 may route the data request to the database server 50 in step 440.

If the database cache server 110 determines that it can successfully respond to the data request, the database cache server 110 may retrieve the data in step 450. For example, the database cache server 110 may perform a table lookup to generate the data in response to the data request. Once the database cache server 110 has retrieved the data in step 450, the resulting data is returned to the data request generator 200. For example, the database cache server 110 may write the data resulting from the table lookup to the unidirectional pipe for the data request generator 200 to read.

Alternatively, if the database cache server 110 determines that it cannot successfully respond to the data request, the database cache server 110 may route the data request to the database server 50, as illustrated in step 440. Once the database server 50 has received the data request, the database server 50 may then retrieve the data in step 470. In step 480, the database server 50 may send the resulting data to the database cache server 110 of client 10. Once the database cache server 110 has received the resulting data from the database server 50, a response is returned to the data request generator 200. For example, the database cache server 110 may write the data resulting from the table lookup to the unidirectional pipe for the data request generator 200 to read.

Figure 5:
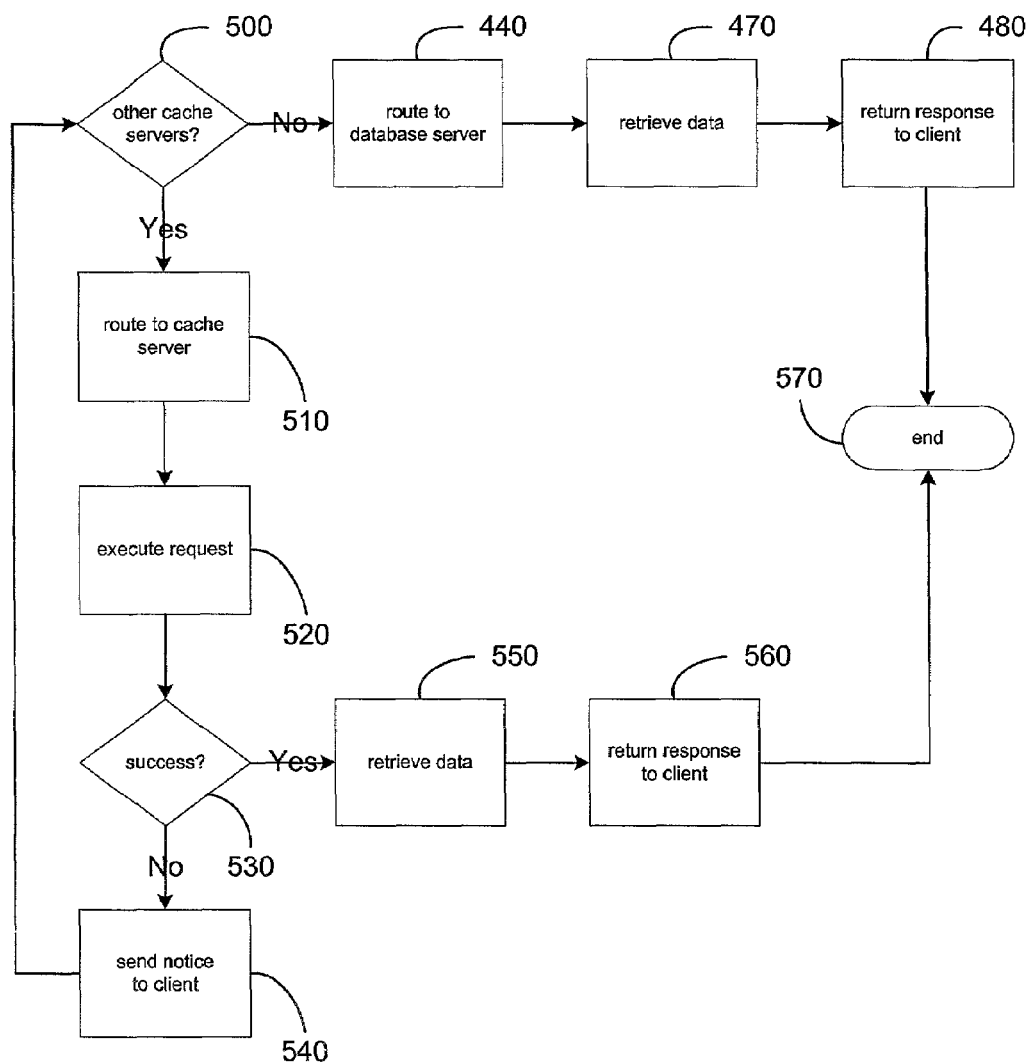
FIG. 5 depicts a flowchart of a process for routing queries to database cache servers according to one embodiment of the present invention.

FIG. 5 depicts a flowchart illustrating a process for request router 250 to efficiently route data requests according to one embodiment of the present invention. The routing process begins once request router 250 has determined that the database 260 does not contain the appropriate tables to successfully respond to a data request. In step 500, the request router 250 may determine if there are any peer database cache servers available to process the data request.

In one embodiment, the database cache server 110 maintains a table in database 260 that includes a list of available peer database cache servers. The list may be maintained as a simple text file or as a data record entry in a database. Additionally, the list may contain various types of information germane to operation such as node names, computer names, peer database cache server names, historical lists of queries, success/failure rates for each query and for each peer database cache server, routing information, IP addresses, ethernet addresses, and the like. If there are no peer database cache servers available, in step 440 the request router 250 may route the data request to database server 50. Once the database server 50 has received the data request, the database server 50 may then retrieve the data in step 470. In step 480, the database server 50 may send the resulting data to the database cache server 110 of client 10. Once the database cache server 110 has received the resulting data from the database server 50, a response is returned to the data request generator 200. For example, the database cache server 110 may write the data resulting from the table lookup to the unidirectional pipe for the data request generator 200 to read.

Alternatively, when peer database cache servers are available to process the data request, the request router 250 may intelligently route the data request to a peer database cache server, as illustrated in step 510. In one embodiment, the database cache server 110 maintains information in database 260 regarding the available pool of peer database cache servers, In one embodiment, a list of available peers may be provided to the system by an administrator and maintained manually or dynamically. Alternatively, each peer on the network may broadcast its presence and a list may be initially populated and perpetually maintained by receipt of such information broadcast over the network. This additional information may comprise statistics for each peer database cache server regarding each database cache server's ability to successfully respond to a data request of a particular type. Furthermore, the information in the tables may be periodically synchronized at regular intervals using standard database replication technology that is well known in the art.

For example, if peer database cache server 120 had successfully responded to a particular data request from client 10 in the past, a record of that successful response may be present in the database 260 of database cache server 110. In such an example, request router 250 may advantageously route subsequent data requests of that particular type to database cache server 120. Alternatively, database 260 may also contain information regarding the queries for which each peer database cache server failed to respond successfully. For example, if peer database cache server 130 had failed to successfully respond to a data request from client 10 in the past, a record of that failure may be present in the database 260 of database cache server 110. In such an example, request router 250 may advantageously refrain from routing subsequent data requests of that particular type to database cache server 130.

Once the data request has been routed to a peer database cache server in step 510, the peer database cache server executes the data request in step 520. Execution of the data request may determine whether the peer database cache server contains the appropriate tables to satisfy the data request. In step 530, the peer database cache server may analyze the results of the data request execution to make this determination. In one embodiment, if the tables in the peer database cache server do not contain the appropriate data to respond to the data request, the peer database cache server sends a failure notice to the originating peer.

Once a failure notice has been received by client 10, the process iterates and request router 250 may then determine if there are additional peer database cache servers available to process the data request. If there are no additional peer database cache servers, the request router 250 may route the data request to the database server 50 for processing, as shown in step 440.

However, in step 530 if the peer database cache server executes the data request and determines that it has the appropriate tables to satisfy the data request, the peer database cache server retrieves the data in step 550. The resulting data from the table lookup is then returned as a response to client 10 in step 560.

Once the client 10 has received a successful response to the data request from a peer database cache server or the database server 50, the database cache server 110 may send the resulting data to the data request generator 200 through the communications channel 270. For example, the database cache server 110 may write the resulting data to the unidirectional pipe for the data request generator 200 to read.

Figure 6:
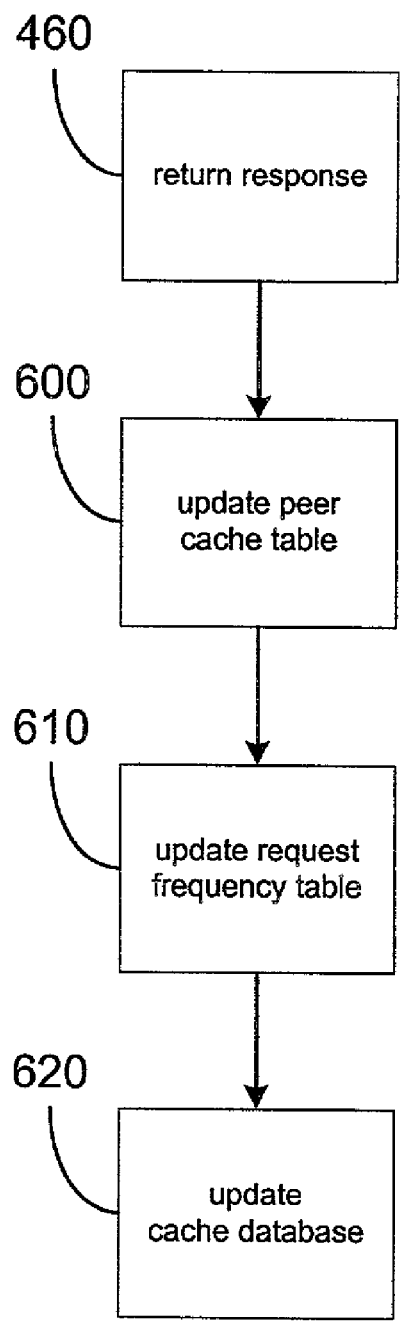
FIG. 6 depicts a flowchart of a process for managing the data maintained in a cache according to one embodiment of the present invention.

FIG. 6 depicts a flowchart illustrating a process for database cache server 110 to maintain routing tables and statistics in database 260 to facilitate the efficient routing of data requests according to one embodiment of the present invention. As stated above, the database 260 may contain information regarding the success and failure of each peer database cache server's prior responses to particular types of data requests. For example, each time the request router 250 routes a data request to a peer database cache server, the database cache server 110 may store the success or failure of the response to the data request in a table in database 260. The resulting table may contain extensive data regarding the ability of each peer database cache server to successfully respond to a particular type of data request. This data may then be used by the request router 250 to intelligently select a peer database cache server to subsequently receive a particular type of data request.

Some example types of data that may be stored in database 260 include the frequency of execution of particular queries, a list of which peers have successfully responded to the query, a list of which peers have not successfully responded to the query, and a user and query combination of success and failure, just to name a few.

Once the client 10 has received a response from a peer database cache server, in step 600 the database cache server 110 may update the appropriate tables in database 260 regarding the particular peer database cache server and the particular type of data request. In this fashion, the database cache server 110 is able to compile statistics regarding the success and failure rates of peer database cache servers.

Additionally, the database cache server 110 may also maintain tables in database 260 to reflect the frequency of particular data requests. This information may allow the database cache server 110 to intelligently determine which tables should be stored locally in database 260. For example, if a certain data request is repeatedly requested by data generator 200, a table in the database 260 may reflect the frequency of that request. In step 610, the database cache server updates the tables in database 260 to reflect the frequency of particular data request requests. In this fashion, the database cache server 110 may record statistics regarding the most frequent data requests and maintain the tables in database 260 accordingly.

In one embodiment, if the frequency of a particular type of data request reaches a certain threshold, the database cache server 110 may intelligently decide to store in database 260 the tables necessary to successfully respond to a data request of that particular type. Additionally, if the database 260 is limited to a finite size, the database cache server 110 may remove certain tables from database 260 that have a diminished frequency of request. This may be done by the database cache server 110 in order to create the necessary space for the more frequently requested tables.

For example, in step 620, the database cache server 110 may update the tables in database 260 with tables received from the database server 50 or a peer database cache server. In one embodiment, if the database cache server 110 did not have the tables in the database 260 to successfully respond to a data request, the data request may be sent by the request router 250 to the database server 50. When the client 10 receives the response data from the database server 50 containing the necessary tables, the database cache server 110 may advantageously save the received tables in the database 260. In this fashion, the next data request of that particular type may be successfully processed by the database cache server 110. Advantageously, the processing of data requests by the database cache server 110 reduces the overall data request response time and also decreases the overall load on the database server 50.

2. Exemplary Embodiment

Below, an example implementation of the present invention is described to provide further detail of alternative applications of the present invention. The recitation of this example embodiment is included to provide additional description and in no way should be construed to limit the broad scope contemplated by the present invention.

Figure 7:
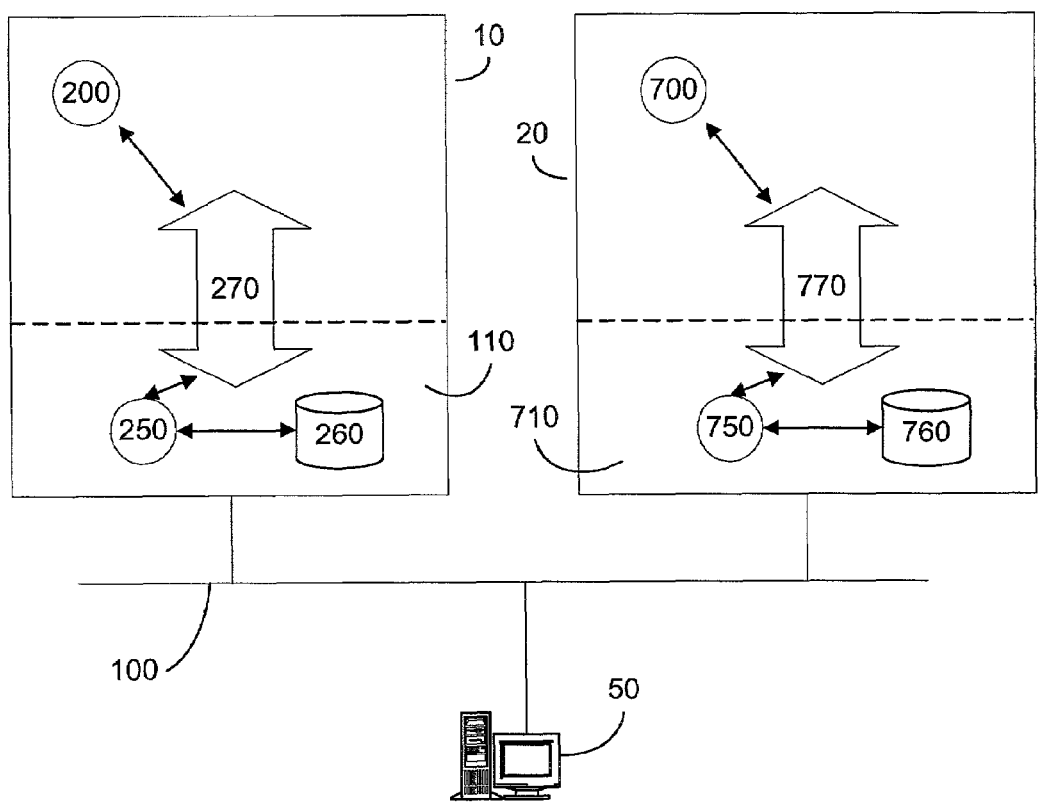
FIG. 7 is a block diagram illustrating a client computer integrated into the n-tier database environment according to one embodiment of the present invention.

FIG. 7 is a block diagram showing the network oriented n-tier database system used for the purpose of the illustrated example. Items from previous figures are like numbered to avoid confusion. Therefore, the system has a client 10 and a client 20, coupled with a database server 50 over network 100.

Client 10 is comprised of a data request generator 200 programmably communicating with a database cache server 110 via a communications channel 270. The database cache server 110 is comprised of a request router 250 and database 260.

Client 20 is similarly comprised of a data request generator 700 in operative communication with a database cache server 710 via a communications link 770. The database cache server 710 comprised of a request router 750 and database 760.

The clients 10 and 20 may be configured to start with a particular initialization state. The initialization process that leads to the initialization state may be modified to achieve the desired initialization state. For example, in one state, the request router 250 is not engaged. In this embodiment, the database cache server 110 is disabled and the client 110 sends each data request generated by the data request generator 200 directly to the database server 50.

Alternatively, the request router 250 may be engaged during initialization. For example, an environment variable or system flag can be set to indicate to the client 10 that the request router 250 should be engaged. In one embodiment, the environment variable may be called ORA_OCI_CACHE and set to a true value.

The request router 250 may also be engaged by starting up the database client in cache mode. For example, this may be accomplished by the use of a flag or a switch supplied to the database client application when that application is executed. In one embodiment, the switch OCI_CACHE is supplied as a command line argument when the database client application is executed. The presence of this switch on the command line may then cause the database client application to engage the request router 250.

When the initialization state engages the request router 250, the database cache server 110 is enabled and data requests from data request generator 200 are handled by the database cache server 110. The database cache server 110 may respond to the data request directly, from the tables in database 260, or the database cache server 110 may route the data request to a peer database cache server or the database server 50.

During the initialization stage, the tables of database 260 may be enhanced to contain information regarding the availability of peer database cache servers on the network 100. For example, database 260 may contain a table that contains a list of available peer database cache servers. The list may also include the network address of the peer database cache server. Additionally, the list may include the set of data that each peer database cache server maintains. In the present embodiment, an administrator may edit the peer database cache server table in database 260 on client 10 to update the list of available peer database cache servers to include client 20, the network address of client 20, and the set of tables maintained by client 20. When the client 10 is subsequently initialized and the request router 250 is engaged, client 10 may route particular requests to client 20 for processing.

In the present illustrated embodiment, a data request may be created by the data request generator 200. Following this request through the network oriented n-tier database environment, the request is sent by the data request generator 200 to the database cache server 110. The data request generator 200 sends the data request through communications channel 270. In one example, the communications link may be implemented through the use of inter process communication.

When a data request is passed to the database cache server 110, it is received by the request router 250. The request router 250 then executes the request to determine whether the cache 110 may successfully respond to the request. For example, the request router 250 determines if the database 260 contains the appropriate tables to allow the cache 110 to respond to the data request. If the necessary tables are present in database 260, a table lookup is performed on database 260 and the resulting response is sent back to the request generator 200 by the request router 250. The resulting response is sent to the request generator 200 through the communications channel 270.

In the case where the database 260 does not contain the necessary tables to respond to the data request, the request router 250 may forward the data request to the database server 50 or the client 20, which is a peer database cache server. For example, when the client 10 was initialized, the database 260 may have contained a table that referenced client 20 as a peer database cache server. In this embodiment, the request router 250 may then send the data request to client 20, for processing by request router 750.

When the client 20 receives the data request from client 10, the database cache server 710 handles the request. Specifically, the request router 750 determines if the database 760 contains the appropriate tables to allow the cache 710 to respond to the data request. If the necessary tables are present in database 760, a table lookup is performed on database 760 and the resulting response is sent back to the client 10 by the request router 750. When the client 10 receives the successful response from peer database cache server client 20, the database cache server 110 handles the resulting data. Specifically, the request router 250 sends the resulting response back to the request generator 200. The resulting response is sent to the request generator 200 through the communications channel 270.

After the response has been received, the request router 250 may update the tables in database 260 to reflect the successful response from peer database cache server 20 for this particular type of data request. Additionally, the request router 250 may update the tables in database 260 to reflect the increased frequency of this particular type of data request. Furthermore, the request router 250 may add the tables from the response to the database 260. In this fashion, the database cache server 110 will be able to directly respond to subsequent queries of this particular type.

Alternatively, if the necessary tables are not present in database 760, client 20 is unable to successfully respond to the request. In this embodiment, the request router 750 sends a failure notice back to client 10 indicating the failure. When the client 10 receives the failure notice from peer database cache server client 20, the database cache server 110 handles the response. For example, after the failure notice has been received, the request router 250 may update the tables in database 260 to reflect the unsuccessful response from peer database cache server 20 for this particular type of data request. Additionally, the request router 250 may update the tables in database 260 to reflect the increased frequency of this particular type of data request.

Once the request router 250 has processed the failure notice from peer database cache server client 20, the request router 250 determines the next available server that may process the request. In this illustrated example, the remaining available server is the database server 50. Therefore, the request router 250 next sends the data request to the database server 50.

The database server 50 receives the data request from client 10 and processes the request. The resulting data is sent by the database server 50 back to client 10. When the client 10 receives the successful response from the database server 50, the database cache server 110 handles the resulting data. Specifically, the request router 250 sends the resulting response back to the request generator 200. The resulting response is sent to the request generator 200 through the communications channel 270.

After the response has been received, the request router 250 may update the tables in database 260 to reflect the increased frequency of this particular type of data request. Additionally, the request router 250 may add the tables from the response to the database 260. In this fashion, the database cache server 110 will be able to directly respond to subsequent queries of this particular type.

Figure 8:
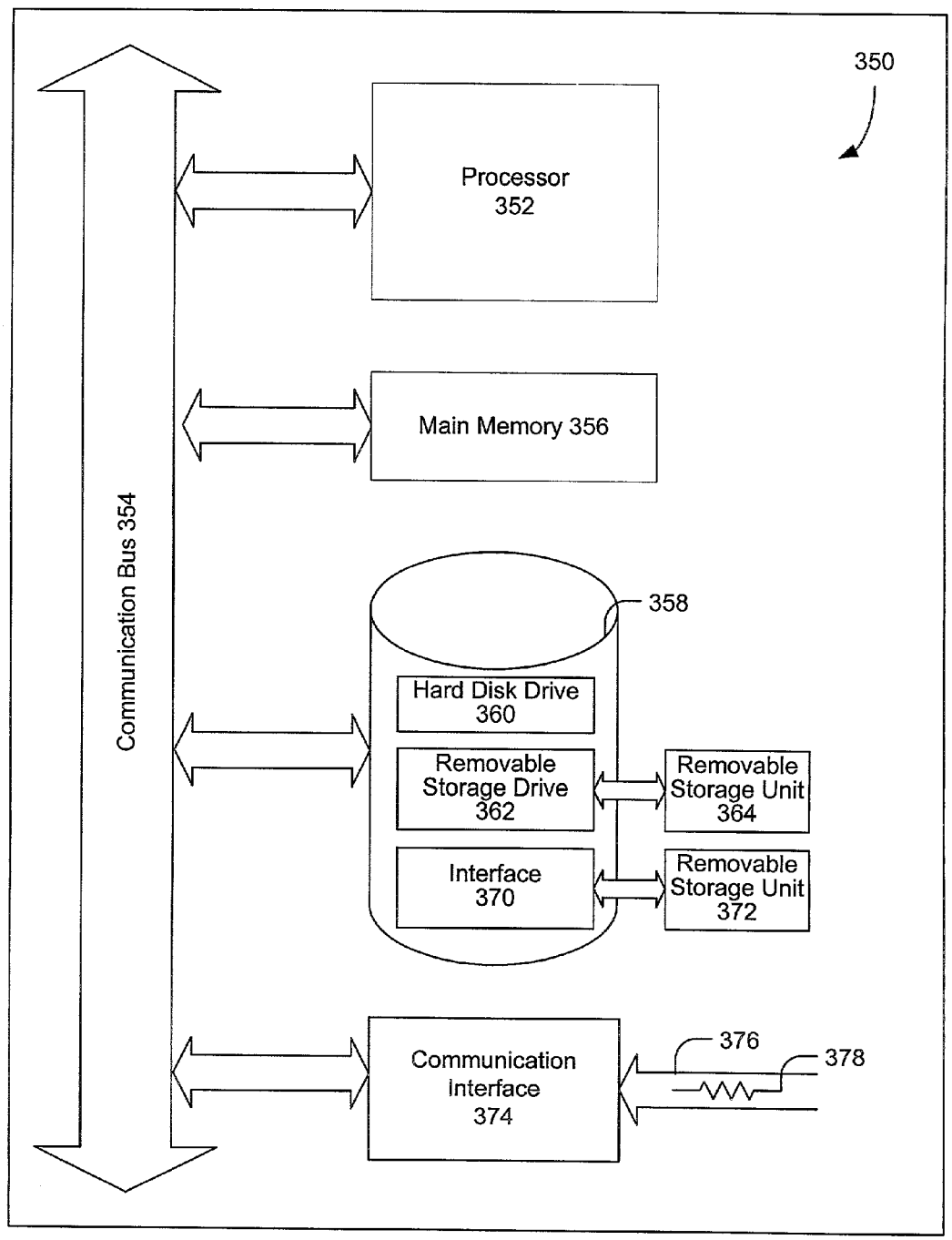
FIG. 8 is a block diagram illustrating an exemplary computer system in which elements and functionality of the present invention are implemented according to one embodiment of the present invention.

FIG. 8 is a block diagram illustrating an exemplary computer system 350 which may be used in connection with various embodiments described herein. For example, the computer system 350 may be used in conjunction with a client, a database server, a data warehouse, a database management system, or to provide connectivity, data storage, and other features useful for effectuating efficient SQL processing in an n-tier architecture. However, other computer systems and/or architectures may be used, as will be clear to those skilled in the art.

The computer system 350 preferably includes one or more processors, such as processor 352. Additional processors may be provided, such as an auxiliary processor to manage input/output, an auxiliary processor to perform floating point mathematical operations, a special-purpose microprocessor having an architecture suitable for fast execution of signal processing algorithms ("digital signal processor"), a slave processor subordinate to the main processing system ("back-end processor"), an additional microprocessor or controller for dual or multiple processor systems, or a coprocessor. Such auxiliary processors may be discrete processors or may be integrated with the processor 352.

The processor 352 is preferably connected to a communication bus 354. The communication bus 354 may include a data channel for facilitating information transfer between storage and other peripheral components of the computer system 350. The communication bus 354 further may provide a set of signals used for communication with the processor 352, including a data bus, address bus, and control bus (not shown). The communication bus 354 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

Computer system 350 preferably includes a main memory 356 and may also include a secondary memory 358. The main memory 356 provides storage of instructions and data for programs executing on the processor 352. The main memory 356 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, as well as read only memory (ROM).

The secondary memory 358 may optionally include a hard disk drive 360 and/or a removable storage drive 362, for example a floppy disk drive, a magnetic tape drive, an optical disk drive, etc. The removable storage drive 362 reads from and/or writes to a removable storage unit 364 in a well-known manner. Removable storage unit 364 may be, for example, a floppy disk, magnetic tape, optical disk, etc. which is read by and/or written to by removable storage drive 362. The removable storage unit 364 includes a computer usable storage medium having stored therein computer software and/or data.

In alternative embodiments, secondary memory 358 may include other similar means for allowing computer programs or other instructions to be loaded into the computer system 350. Such means may include, for example, a removable storage unit 372 and an interface 370. Examples of secondary memory 358 may include semiconductor-based memory such as programmable read-only memory (PROM), erasable programmable read-only memory (EPROM), electrically erasable read-only memory (EEPROM), or flash memory (block oriented memory similar to EEPROM). Also included are any other removable storage units 372 and interfaces 370, which allow software and data to be transferred from the removable storage unit 372 to the computer system 350.

Computer system 350 may also include a communication interface 374. The communication interface 374 allows software and data to be transferred between computer system 350 and external devices, networks or information sources. Examples of some types of components that might comprise communication interface 374 include a modem, a network interface (such as an Ethernet card), a communications port, a PCMCIA slot and card, and an infrared interface, to name a few. Communication interface 374 preferably implements industry promulgated protocol standards, such as Ethernet IEEE 802 standards, Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement non-standard interface protocols as well. Software and data transferred via communication interface 374 are generally in the form of signals 378 which may be electronic, electromagnetic, optical or other signals capable of being received by communication interface 374. These signals 378 are provided to communication interface 374 via a channel 376. This channel 376 carries signals 378 and can be implemented using wire or cable, fiber optics, a phone line, a cellular phone link, a radio frequency (RF) link, or other communications channels.

Computer programming instructions (i.e., computer programs or software) are stored in the main memory 356 and/or the secondary memory 358. Computer programs can also be received via communication interface 374. Such computer programs, when executed, enable the computer system 350 to perform the features relating to the present invention as discussed herein.

In this document, the term "computer program product" is used to refer to any media used to provide programming instructions to the computer system 350. Examples of these media include removable storage units 364 and 372, a hard disk installed in hard disk drive 360, and signals 378. These computer program products are means for providing programming instructions to the computer system 350.

In an embodiment that is implemented using software, the software may be stored in a computer program product and loaded into computer system 350 using hard drive 360, removable storage drive 362, interface 370 or communication interface 374. The software, when executed by the processor 352, may cause the processor 352 to perform the features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will be apparent those skilled in the relevant art. Various embodiments may also be implemented using a combination of both hardware and software.

While the particular method and apparatus for efficient SQL processing in an n-tier architecture herein shown and described in detail is fully capable of attaining the above described objects of this invention, it is to be understood that the description and drawings represent a present embodiment of the invention and, as such, are representative of the subject matter that is broadly contemplated by the present invention. It is further understood that the scope of the present invention fully encompasses other embodiments that may become obvious to those skilled in the art, and that the scope of the present invention is accordingly limited by nothing other than the appended claims.

What is claimed is:

1. A computer implemented method for responding to a data request in an n-tier computer network environment, comprising:
    receiving the data request for data of a particular type from a data request generator;
    determining whether a partial database in a local database cache of a client computing system contains the data, the local database cache communicatively coupled to the data request generator, wherein the act of determining whether the partial database contains the data is performed by a processor;
    routing the data request to a peer database cache of a first peer client computing system of the client computing system based at least in part on a result from the act of determining, wherein
        the first peer client computing system of the client computing system is on a same tier with the local database cache server of the client computing system in an n-tier computer architecture; and
    tracking data stored in the peer database cache or in the partial database and storing a response to the data request to a location in the peer database cache or in the partial database based on a result of an act of comparing a statistic for the data request to a predetermined statistic.

2. The computer implemented method of claim 1, wherein the data request is routed to the first peer client computing system if the partial database does not contain the data.

3. The computer implemented method of claim 1, wherein the step of routing further comprises selecting the first peer client computing system from a list of peer client computing systems, wherein the first peer client computing system is selected based on a success of the first peer client computing system to respond to a type of data request.

4. The computer implemented method of claim 1, wherein the step of routing further comprises selecting the first peer client computing system from a list of peer client computing systems, wherein the first peer client computing system is selected based on a failure of a second peer client computing system to respond to a type of data request.

5. The computer implemented method of claim 1, wherein the step of routing further comprises:
    sending the data request to a database server; and
    passing the data request from the database server to the first peer client computing system.

6. The computer implemented method of claim 1, further comprising saving information regarding a success of the first peer client computing system to respond to a type of data request.

7. The computer implemented method of claim 1, further comprising saving information regarding a failure of the first peer client computing system to respond to a type of data request.

8. The computer implemented method of claim 1, further comprising saving the data response to a location in the database cache.

9. The computer implemented method of claim 8, wherein the step of saving comprises:
    calculating a frequency for the data request;
    comparing the frequency for the data request to a predetermined frequency; and
    saving the data response to the location in the database cache if the frequency is greater than the predetermined frequency.

10. The computer implemented method of claim 8, wherein step of saving comprises:
    calculating a response time for the data request;
    comparing the response time for the data request to a predetermined response time; and
    saving the data response to the location in the database cache if the response time is less than the predetermined response time.

11. A computer program product that includes a computer usable storage medium usable by a processor, the medium having stored thereon a sequence of instructions which, when executed by the processor, causes a process to be performed, the process comprising:
    receiving the data request for data of a particular type from a data request generator;
    determining whether a partial database in a local database cache of a client computing system contains the data, the local database cache communicatively coupled to the data request generator, wherein the act of determining whether the partial database contains the data is performed by a processor;

routing the data request to a peer database cache of a first peer client computing system of the client computing system based at least in part on a result from the act of determining, wherein the first peer client computing system of the client computing system is on a same tier with the client computing system in an n-tier computer architecture; and tracking the data stored in the peer database cache or in the partial database and storing a response to the data request to a location in the peer database cache or in the partial database based on a result of an act of comparing a statistic for the data request to a predetermined statistic.

12. The computer program product of claim 11, wherein the process further comprises saving information regarding a success of the first peer client computing system to respond to a type of data request.

13. The computer program product of claim 11, wherein the process further comprises saving information regarding a failure of the first peer client computing system to respond to a type of data request.

14. A system for responding to a data request in an n-tier computer network environment, comprising:

means for receiving the data request for data of a particular type from a data request generator;

a processor configured for determining whether a partial database in a local database cache of a client computing system contains the data, the local database cache communicatively coupled to the data request generator;

means for routing the data request to a peer database cache of a first peer client computing system of the client computing system based at least in part on a result from the act of determining, wherein the first peer client computing system of the client computing system is on a same tier with the client computing system in an n-tier computer architecture; and means for tracking the data stored in the peer database cache or in the partial database and storing a response to the data request to a location in the peer database cache or in the partial database based on a result of an act of comparing a statistic for the data request to a predetermined statistic.

15. The system of claim 14, further comprising means for saving information regarding a success of the first peer client computing system to respond to a type of data request.

16. The system of claim 14, further comprising means for saving information regarding a failure of the first peer client computing system to respond to a type of data request.

17. A method for responding to a data request in a computer network environment, comprising:

receiving the data request for data;

determining whether a partial database in a local database cache of a client computing system contains the data, wherein the act of determining whether the partial database contains the data is performed by a processor;

selecting a first peer client computing system of the client computing system to which the data request is to be routed, the first peer client computing system selected based at least in part on information indicating a success of the first peer client computing system in responding to a previous data request;

routing the data request to the first peer client computing system, wherein the first peer client computing system of the client computing system is on a same tier with the client computing system in an n-tier computer architecture; and tracking the data stored in the first peer client database cache or in the partial database and storing a response to the data request to a location in the peer database cache or in the partial database based on a result of an act of comparing a statistic for the data request to a predetermined statistic.

18. The method of claim 17, further comprising selecting a second peer client computer to which the data request is to be routed, the second peer client computing system selected based at least in part on information regarding a success of the second peer client computing system in responding to a previous data request.

19. The method of claim 17, further comprising receiving data response for the data request from the first peer client computing system.

20. The method of claim 19, further comprising storing information regarding an ability of the first peer client computing system to respond to the data request.

21. The method of claim 17, further comprising determining a second peer client computing system to which the data request is not to be routed, the second peer client computing system determined based at least in part on information regarding a failure of the second peer client computing system in responding to a previous data request.

22. A computer program product that includes a computer storage medium usable by a processor, the medium having stored thereon a sequence of instructions which, when executed by the processor, causes a process to be performed, the process comprising:

receiving a data request for a data;

determining whether a partial database in a local database cache of a client computing system contains the data, wherein the act of determining whether the partial database contains the data is performed by a processor;

selecting a first peer client computing system of the client computing system to which the data request is to be routed, the first peer client computing system selected based at least in part on information indicating a success of the first peer client computing system in responding to a previous data request, wherein the first peer client computing system of the client is on a same tier with the client computing system in an n-tier computer architecture;

routing the data request to the first peer client computing system; and tracking the data stored in the peer database cache or in the partial database and storing a response to the data request to a location in the peer database cache or in the partial database based on a result of an act of comparing a statistic for the data request to a predetermined statistic.

23. The computer program product of claim 22, wherein the process further comprises selecting a second peer client computing system to which the data request is to be routed, the second peer client computing system selected based at least in part on information regarding a success of the second peer client computing system in responding to a previous data request.

24. The computer program product of claim 22, wherein the process further comprises receiving data response for the data request from the first peer client computing system.

25. The computer program product of claim 24, wherein the process further comprises storing information regarding an ability of the first peer client computing system to respond to the data request.

26. The computer program product of claim 22, wherein the process further comprises determining a second peer client computing system to which the data request is not to be routed, the second peer client computing system determined based at least in part on information regarding a failure of the second peer client computing system in responding to a previous data request.

27. A system for responding to a data request in a computer network environment, comprising:
   means for receiving the data request for a data;
   a processor configured for determining whether a partial database in a local database cache of a client computing system contains the data;
   means for selecting a first peer client computing system of the client to which the data request is to be routed, the first peer client computing system selected based at least in part on information indicating a success of the first peer client computing system in responding to a previous data request, wherein the first peer client computing system of the client is on a same tier with the client computing system in an n-tier computer architecture;
   means for routing the data request to the first peer client computing system; and
   means for tracking the data stored in the peer database cache or in the partial database and storing a response to the data request to a location in the peer database cache or in the partial database based on a result of an act of comparing a statistic for the data request to a predetermined statistic.

28. The system of claim 27, further comprising means for selecting a second peer client computing system to which the data request is to be routed, the second peer client computing system selected based at least in part on information regarding a success of the second peer client computing system in responding to a previous data request.

29. The system of claim 27, further comprising means for receiving data response for the data request from the first peer client computing system.

30. The system of claim 29, further comprising means for storing information regarding an ability of the first peer client computing system to respond to the data request.

31. The system of claim 27, further comprising means for determining a second peer client computing system to which the data request is not to be routed, the second peer client computing system determined based at least in part on information regarding a failure of the second peer client computing system in responding to a previous data request.

32. A computer implemented method for responding to a data request in an n-tier computer network environment, comprising:
   receiving the data request for data of a particular type from a data request generator;
   determining whether a partial database in a local database cache of a client computing system contains the data, the local database cache communicatively coupled to the data request generator, wherein the act of determinmg whether the partial database contains the data is performed by a processor;
   routing the data request to a peer database cache of a first peer client computing system of the client computing system based at least in part on a result from the act of determining, wherein the first peer client computing system of the client is on a same tier with the client computing system in an n-tier computer architecture;
   saving a response to the data request to a location in the database cache, wherein an act of saving the response to the data request comprises:
      calculating a statistic for the data request, wherein the statistic comprises a response time for the data request or a frequency of the data request;
      comparing the statistic for the data request to a predetermined statistic; and
      saving the response to the location in the database cache based at least in part upon a result of an act of comparing the statistic the statistic for the data request to the predetermined statistic; and
   tracking data stored in the peer database cache and storing information on the data stored in the peer database cache in the client computing system.

33. A system for responding to a data request in an n-tier computer network environment, comprising:
   means for receiving the data request for data of a particular type from a data request generator;
   a processor configured for determining whether a partial database in a local database cache of a client computing system contains the data, the local database cache commmunicatively coupled to the data request generator;
   means for routing the data request to a peer database cache of a first peer client computing system of the client computing system based at least in part on a result from the act of determining, wherein the first peer client computing system of the
   client is on a same tier with the client computing system in an n-tier computer architecture;
   means for saving a response to the data request to a location in the database cache, wherein the means for saving the response to the data request comprises:
      means for calculating a statistic for the data request, wherein the statistic comprises a response time for the data request or a frequency of the data request;
      means for comparing the statistic for the data request to a predetermined statistic; and
      means for saving the response to the location in the database cache based at least in part upon a result of an act of comparing the statistic the statistic for the data request to the predetermined statistic; and
   means for tracking data stored in the peer database cache and storing information on the data stored in the peer database cache in the client computing system.

34. A computer program product that includes a computer usable storage medium usable by a processor, the medium having stored thereon a sequence of instructions which, when executed by the processor, causes a process to be performed for responding to a data request in an n-tier computer network environment, the process comprising:
   receiving the data request for data of a particular type from a data request generator;
   determining whether a partial database in a local database cache of a client computing system contains the data, the local database cache communicatively coupled to the data request generator, wherein the act of determining whether the partial database contains the data is performed by a processor;
   routing the data request to a peer database cache of a first peer client computing system of the client computing system based at least in part on a result from the act of determining, wherein the first peer client computing system of the client is on a same tier with the client computing system in an n-tier computer architecture;
   saving a response to the data request to a location in the database cache, wherein an act of saving the response to the data request comprises:

calculating a statistic for the data request, wherein the statistic comprises a response time for the data request or a frequency of the data request;

comparing the statistic for the data request to a predetermined statistic; and saving the response to the location in the database cache based at least in part upon a result of an act of comparing the statistic the statistic for the data request to the predetermined statistic; and tracking data stored in the peer database cache and storing information on the data stored in the peer database cache in the client computing system.

* * * * *

UNITED STATES PATENT AND TRADEMARK OFFICE
CERTIFICATE OF CORRECTION

PATENT NO. : 7,580,971 B1 Page 1 of 1
APPLICATION NO. : 09/953490
DATED : August 25, 2009
INVENTOR(S) : Gollapudi et al.

It is certified that error appears in the above-identified patent and that said Letters Patent is hereby corrected as shown below:

Title page, item (*) Notice: Subject to any disclaimer, the term of this patent is extended or adjusted under 35 U.S.C. 154(b) by 484 days.

Delete "484 days" and insert -- 827 days --.

In column 5, line 14, delete "lit" and insert -- list --, therefor.

In column 9, line 40, delete "710" and insert -- 710 is --, therefor.

In column 16, line 34, in claim 22, delete "a" and insert -- the --, therefor.

In column 17, line 55, in claim 32, delete "determinmg" and insert -- determining --, therefor.

In column 18, line 8, in claim 32, delete "the statistic the statistic" and insert -- the statistic --, therefor.

In column 18, line 39, in claim 33, delete "the statistic the statistic" and insert -- the statistic --, therefor.

In column 18, line 58, in claim 34, delete "a" and insert -- the --, therefor.

In column 20, line 1, in claim 34, delete "the statistic the statistic" and insert -- the statistic --, therefor.

Signed and Sealed this

Twenty-seventh Day of July, 2010

David J. Kappos
*Director of the United States Patent and Trademark Office*

UNITED STATES PATENT AND TRADEMARK OFFICE
CERTIFICATE OF CORRECTION

PATENT NO.      : 7,580,971 B1                         Page 1 of 1
APPLICATION NO. : 09/953490
DATED           : August 25, 2009
INVENTOR(S)     : Gollapudi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 827 days.

Signed and Sealed this

Fourteenth Day of September, 2010

David J. Kappos
*Director of the United States Patent and Trademark Office*